Patented July 27, 1943

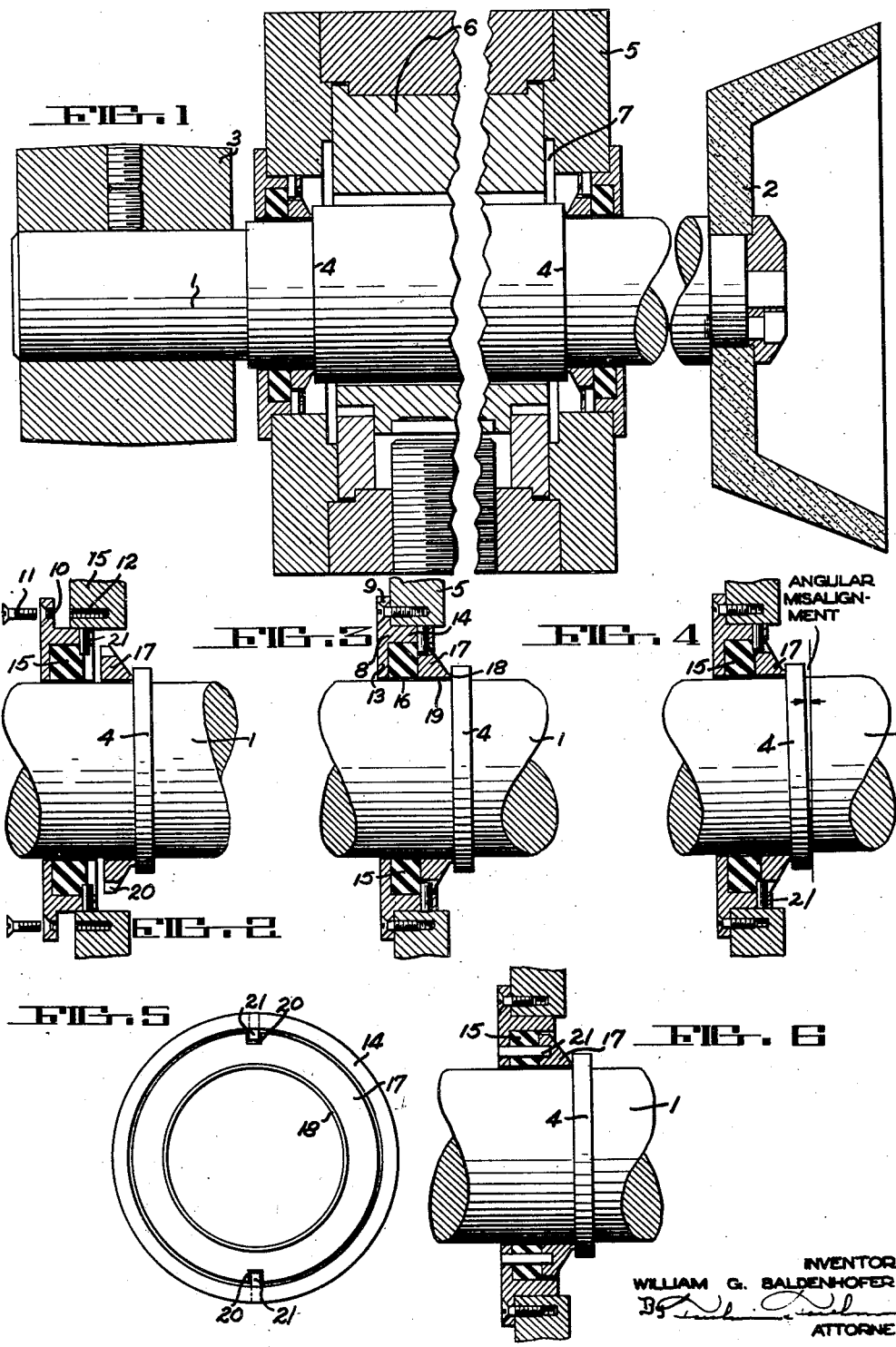

2,325,296

UNITED STATES PATENT OFFICE 2,325,296

LUBRICANT SEAL FOR SHAFTS

William G. Baldenhofer, Springfield, Ohio, assignor to The Thompson Grinder Company, Springfield, Ohio, a corporation of Ohio Application October 17, 1941, Serial No. 415,441

1 Claim. (Cl. 286—7)

My invention relates to means of providing a seal for shafts, and particularly a lubricant seal for shafts that gyrate.

It is the object of this invention to provide a lubricant seal for maintaining lubricant in the bearings supporting a shaft, particularly a shaft for grinding mechanisms where a power source is applied at one end of the shaft and a grinding wheel is applied at the other end of the shaft. Frequently this condition is aggravated by the mounting of a rotor of a driving motor on one end of the shaft counterbalancing the grinding wheel at the other end of the shaft. This results in a certain amount of angular misalignment of the shaft due to the gyratory effect set up in the shaft due to the variations of power and load applied to the opposite ends of the shaft.

It is a further object of this invention to provide a seal in which the contacts are metal to metal and can be made highly accurate to provide a very perfect seal while at the same time, having all of the advantages of a sealing member that is yielding and will accommodate itself to take necessary angular misalignments of such a shaft.

It is a further object to provide a seal that will not be affected by the oil in the bearing around the shaft as well as a seal that will not leak irrespective of the angular position of the shaft.

It is the object to get the benefit of a resilient seal and the advantage of a metal to metal seal without the disadvantages of the wear of a resilient seal and the leaking of a metal to metal seal.

Referring to the drawing:

Figure 1 is a view, partially in section, and partially broken away, showing a grinding wheel shaft with a grinding wheel in section on one end and a driving pulley in section on the other end, with the bearing housing and bearing support with the sealing mechanism of this invention in section;

Figure 2 is a diagrammatic view, partially in section, showing the sealing mechanism of this invention prior to assembly;

Figure 3 is a similar view showing the sealing mechanism assembled with the shaft in its normal, aligned position;

Figure 4 is a similar view to Figure 3 showing the shaft with some angular misalignment;

Figure 5 is a detailed view showing the arrangement of the sealing ring, the retaining ring and the interlocking mechanism therebetween; and Figure 6 is a view similar to Figure 3 showing a modified form of seal with respect to anchoring the sealing ring against rotation with respect to the remainder of its associate members.

Referring to the drawing in detail:

1 is a shaft that is provided on one end with a grinding wheel 2, and on the other end a driving pulley 3. Intermediate the ends of the shaft 1, are shoulders 4, of which there may be one or more. In the construction shown in Figure 1, the housing, generally designated 5, through which the shaft 1 passes and in which there is mounted other bearing members generally designated 6, which support the shaft 1, which are lubricated by a lubricant within the chamber 7 inside of the housing 5.

The particular object of this invention is to provide a seal between the shaft 1 and the housing 5, to prevent the escape of lubricant.

For this purpose there is provided a retaining ring designated 8, comprising a retaining flange 9, having threaded bolt apertures 10 for receiving bolts 11, which are threaded at 12 into the housing 5. This ring is provided with an inwardly extending flange 13 and an annular intermediate flange 14 which is parallel with the axis of the shaft 1, thus forming an angular enclosure for an oil proof resilient washer 15. It will be noted that the inner wall 16 of this washer 15, does not touch at any time, the shaft 1. It is therefore not subjected to wear or to the effects of heat from friction. On the inner side of this resilient washer 15 is a sealing ring 17, having a bearing edge 18, which is finely ground to make a close working fit with the side of the shoulder or flange 4 on the shaft 1. Here again it will be noted that the inner face 19 of the sealing ring 17 is spaced from the surface of the shaft 1. The internal diameter of the sealing ring 17, like that of the resilient member 15, is greater than the external diameter of the shaft 1. To prevent the rotation of the sealing ring 17, due to its engagement through the faces 18, with the shoulder 4 on the shaft 1, the sealing ring 17 is recessed at one or more points on its periphery as at 20, so that it can receive the stop pins 21 which are mounted in the housing 5 or in the flange 14 of the retaining ring 3, preferably the latter.

It will also be observed that the interior diameter of the retaining ring is greater than the exterior diameter of the shaft 1. The shaft 1, can therefore lock or gyrate without touching any part of the sealing member or the frame 5 except the ground edge or face 18 of the sealing ring, and such an engagement will be wholly between the shoulder 4 of the shaft 1, and its limited ground hardened face 18 of the sealing ring 17 thereby effecting a seal, while at the same time accommodating the seal with the minimum of friction and wear to the misalignments of the shaft 1. It will furthermore be observed that this accommodation is made possible by the resilient backing member 15, acting as a washer or gasket or resilient cushion. It will be noted that this cushion 15, is subjected to the minimum of lubricant, and therefore, is enforcing the maximum life. Furthermore, it is possible with this arrangement to eliminate all friction between the shaft and the seal, thereby minimizing the loss of horsepower and the wear upon the sealing member, as the only engagement is between the limited hardened areas of the sealing ring and the shoulder on the shaft.

Referring to Figure 6, it will be noted that there is a modification in the location of the retaining pins 21, which are, in this instance, mounted in a horizontal position extending through the sealing ring 15, and therefore, have some additional advantage in preventing any tendency of this ring to creep or rotate.

A wide variety of materials may be employed in this construction. For instance, I have found it desirable to use "neoprene" as the washer 15 which is cemented into position in the retaining ring 8. I prefer to use a brass sealing ring 17 of suitable hardness, with a lapped face which bears against a hardened lapped shoulder 4 on the steel spindle shaft 1. It is obvious that other materials may be employed, but I have found in practice that such materials are satisfactory and give a practical result. It should be further understood, that such a seal is adapted to a variety of uses other than those indicated herein.

It will be understood that I desire to comprehend within my invention such modifications as come within the scope of the claim and the invention.

Having thus fully described my invention, what I claim as new and desire to secure by Letters Patent, is:

In combination, a shaft having a shoulder, a sealing ring adapted to engage said shoulder, the interior diameter of said ring being greater than the external diameter of said shaft, a retaining ring in which said sealing ring is loosely mounted, a resilient washer interposed between said sealing ring and said retaining ring for yieldingly maintaining said sealing ring against the shoulder of said shaft, said sealing ring and said retaining ring comprising a pair of members, and metallic means loosely connecting said members comprising a pin on one member and a recess extending across said other member longitudinally of said shaft, said pin and groove permitting free unrestricted movement of said sealing ring along said shaft in the direction of said resilient washer and in the direction of said shoulder, whereby all circumferential portions of said sealing means may follow angular misalignment movements of said shoulder, while maintaining a tight seal with said shoulder, said retaining ring having a flange, a housing supporting said retaining ring and flange, said pin being mounted in said flange and abutting said housing and said groove whereby said pin is held in position in both directions.

WILLIAM G. BALDENHOFER.